US009324116B2

(12) United States Patent
Cherian

(10) Patent No.: US 9,324,116 B2
(45) Date of Patent: Apr. 26, 2016

(54) ENERGY SERVICES INTERFACE

(75) Inventor: Sunil Cherian, Fort Collins, CO (US)

(73) Assignee: Spirae, Inc., Fort Collins, CO (US)

( * ) Notice: Subject to any disclaimer, the term of this patent is extended or adjusted under 35 U.S.C. 154(b) by 1000 days.

(21) Appl. No.: 13/400,538

(22) Filed: Feb. 20, 2012

(65) Prior Publication Data
US 2013/0054036 A1 Feb. 28, 2013

Related U.S. Application Data

(60) Provisional application No. 61/444,987, filed on Feb. 21, 2011.

(51) Int. Cl.
G05D 3/12 (2006.01)
G05D 5/00 (2006.01)
G05D 9/00 (2006.01)
G05D 11/00 (2006.01)
G01R 11/56 (2006.01)
G01R 21/133 (2006.01)
G06F 17/00 (2006.01)
G06Q 50/06 (2012.01)
G06Q 10/06 (2012.01)
H02J 3/00 (2006.01)
H02J 3/14 (2006.01)

(52) U.S. Cl.
CPC ............... *G06Q 50/06* (2013.01); *G06Q 10/06* (2013.01); *H02J 3/00* (2013.01); *H02J 3/008* (2013.01); *H02J 2003/146* (2013.01); *Y04S 50/00* (2013.01); *Y04S 50/10* (2013.01)

(58) Field of Classification Search
CPC ........... G06Q 50/06; G06Q 10/06; H02J 3/00; H02J 2003/146; H02J 3/008; Y04S 50/00; Y04S 50/10
USPC .......................... 700/286, 295, 297; 705/412
See application file for complete search history.

(56) References Cited

U.S. PATENT DOCUMENTS

| 6,473,744 | B1 | 10/2002 | Tuck et al. | |
| 7,274,975 | B2 * | 9/2007 | Miller | 700/295 |
| 7,783,390 | B2 * | 8/2010 | Miller | 700/291 |
| 8,781,638 | B2 * | 7/2014 | Rouse et al. | 700/291 |
| 2005/0165511 | A1 * | 7/2005 | Fairlie | 700/286 |
| 2006/0195229 | A1 | 8/2006 | Bell et al. | |
| 2007/0005192 | A1 * | 1/2007 | Schoettle et al. | 700/286 |
| 2007/0038335 | A1 | 2/2007 | McIntyre et al. | |
| 2010/0088261 | A1 * | 4/2010 | Montalvo | 706/15 |
| 2010/0179704 | A1 * | 7/2010 | Ozog | 700/291 |
| 2010/1079704 | | 7/2010 | Ozog | |

(Continued)

OTHER PUBLICATIONS

International Search Report and Written Opinion of the International Searching Authority; Dec. 18, 2012, PCT/US2012/25943.

Primary Examiner — Ronald Hartman, Jr.
(74) Attorney, Agent, or Firm — Martensen IP

(57) ABSTRACT

An energy services bridge interposed between one or more energy service providers and an energy distribution network operator manages a plurality of diversified energy consumer service plans so as to be compliant with the physical and technical constraints of the transmission/distribution gird. The energy services bridge further conveys real-time information regarding the state of the transmission/distribution grid to the plurality of energy service providers enabling active management of the service plans and correspondingly active management of the transmission/distribution grid.

51 Claims, 5 Drawing Sheets

(56) References Cited

U.S. PATENT DOCUMENTS

| | | |
|---|---|---|
| 2010/0217550 A1 | 8/2010 | Crabtree et al. |
| 2010/0292857 A1 | 11/2010 | Bose et al. |
| 2010/0320837 A1 | 12/2010 | Harrison |
| 2011/0025556 A1 | 2/2011 | Bridges et al. |
| 2011/0196546 A1* | 8/2011 | Muller et al. ................. 700/295 |
| 2012/0316688 A1* | 12/2012 | Boardman et al. ............ 700/291 |
| 2013/0218355 A1* | 8/2013 | Lazaris ......................... 700/291 |
| 2013/0332000 A1* | 12/2013 | Imes et al. .................... 700/291 |

* cited by examiner

ENERGY SERVICES INTERFACE

RELATED APPLICATION

The present application relates to and claims the benefit of priority to U.S. Provisional Patent Application No. 61/444,987 filed Feb. 21, 2011 which is hereby incorporated by reference in its entirety for all purposes as if fully set forth herein.

BACKGROUND OF THE INVENTION

1. Field of the Invention

Embodiments of the present invention relate, in general, to energy services management and more particularly to systems and methodology for interfacing a plurality of energy service providers with an energy transmission/distribution grid.

2. Relevant Background

Electricity became commercially available when Thomas Edison opened the first generation plant in 1882 in New York City. At the end of the 19th and beginning of the 20th centuries, the growth of the electricity industry was as dramatic and revolutionary as the information technology age has been in the past three decades. Initially, the industry was characterized by numerous private generation facilities competing for customers in close proximity to the plant. By the end of the 1800s, increasingly larger plants with newer technology were able to produce electricity at lower costs per kilowatt-hour, exploiting a phenomenon known as economies of scale. U.S. Public Policy evolved to favor either the municipal ownership of electricity producers or the regulation by states of privately owned producers. The Public Utility Holding Company Act (PUHCA) of 1935 limited the operations of electric companies both geographically and in their financial structure. Along with the Federal Power Act of the same year, the PUHCA led to restructuring of the industry and the creation of a combined state and federal regulatory structure that still exists. By 1999 85% of all electricity production was devoted to utilities and the plants were owned and operated by municipalities. Of the 15% that remained, 51% resided in the manufacturing sector, 23% in services and the remaining 26% distributed among various enterprises. The utility electricity production capability largely favored investor-owned utilities (71%) with Federally owned (10%), publicly owned (13%) and cooperatives (5%) trailing substantially behind. Thus, investor-owned public utilities provided electric power for most Americans.

After energy prices increased by more than 500 percent in the 1970s, policymakers looked for anything that might provide consumers some relief. One result was the Public Utilities Regulatory Policy Act (PURPA) of 1978. The intention of the act was to encourage efficiency and innovation including the development of new independent energy producers. Next came the Energy Policy Act of 1992, which specifically created a class of wholesale power producers exempt from federal regulation. But the goal of a competitive electricity market that placed the consumer as a direct beneficiary remained elusive.

In the mid-1990s the Federal Energy Regulatory Commission (FERC) issued rules that promoted competition in wholesale power markets and required integrated utilities to make their transmission lines available to other producers for a reasonable fee. These policy changes laid a foundation for the deregulation of electricity generation.

The deregulation of the American Industry Infrastructure was primarily a product of the inflationary economic environment of the 1970s. For the most part it was not inspired by the businesses that were being regulated but, rather, came about when Congress was convinced that regulatory reform might reduce consumer prices. The changes began in the energy, transportation, and financial services industries and then spread to other parts of the economy. And while certain benefits with respect to deregulation have been realized (consider the effects for the deregulation of telecommunications), a dynamic and competitive electricity market upon which the consumer can participate has yet to be achieved.

Despite deregulation of some aspects of the electrical utility model, much of today's kilowatt energy delivery services remain regulated. FIG. 1 depicts a high level block diagram of the current utility model for the delivery of kilowatt hours to end consumers as would be known to one of reasonable skill in the relevant art. Energy consumers 100 gain metered 105 electricity through a combined electrical distribution 110 and transmission 120 system. A generation operator 130 uses resources such as coal and gas operated turbines, hydroelectric dams, wind farms and other means to generate electrical power. As one would expect there are a plurality of energy generation operators. At this stage the generated power is a commodity that is traded on the energy markets 145 between the generation operators (energy generation) 130, energy marketers, and retail energy suppliers. Likewise, transmission capacity is purchased and scheduled from transmission operators (energy transmission) 140 to transport electricity from source to delivery locations on the electric grid.

The transmission operator 140 manages and likely owns the power transmission system 120. The transmission system transports large amounts of energy from a primary generation facility to a plurality of smaller distribution systems 110 or distribution networks. Furthermore, a distribution network operator 155 at a distribution operation center 150 manages each distribution network. The energy consumer or end user thereafter interacts directly with the distribution network operator to gain access to the power grid. The distribution network operator, at a high level, is the distributor for energy produced by the generation operator 130 and transported to the distribution center by the transmission operator 140. A retail electricity supplier 165 typically sells power to the energy consumer and is responsible for billing and collections. The retail electricity supplier 165 may be the same entity as the distribution network operator or an unrelated company or companies depending on the state of electricity deregulation in different regions. In some instances the distribution operator uses automatic metering information 160 to validate the metered electricity delivered to the energy consumer 100. In addition to retail electricity sales from the distribution network operator 155, the energy consumer 100 also may access or gain electricity through one or more distributed energy resources 170 such as photovoltaic energy cells or windmills.

The energy market possesses similarities and distinctions from many consumer markets. For example the clothing industry possesses manufacturers that produce the clothes. The clothes are transported from the point of manufacturing to a distributor to ultimately arrive at a retail store and be purchased by the consumer. The energy market, however, is distinct by the non-duplicative and essential nature of the product. While energy can be transported via transmission lines, there is a physical limit to the distance power can be transmitted. Thus unlike much of manufacturing that occurs offshore and is transported worldwide to the market; energy must be generated regionally and transported to local distribution centers. Secondly the transmission lines that enable the transmission and distribution of electricity represent a significant capital investment and it would be inefficient (and unsightly) for multiple entities to maintain duplicative transmission and distribution systems. Thus the current system of transmission and distribution has turned into a regulated infrastructure that can be used by the various transmission 140 and distribution 155 operators to deliver power produced by the generators 130. While transmission 140 and distribution 150 operators are responsible for transporting electricity from generators to consumers, power marketers 145 facilitate the wholesale transactions between the major producers and retail suppliers. Within vertically integrated electric utilities generation, transmission, distribution, and retail sales functions may all be carried out by the same entity. In fully deregulated markets, these functions are carried out by different entities with multiple competitive companies existing for generation 130 and retail 165 while transmission 140 and distribution 150 functions remain regulated monopolies (i.e., common set of wires serve energy consumers, while the electricity delivered may come from different suppliers freely chosen by consumers). So in regions where electricity markets have been "unbundled," competition can exist in power generation and retail sale, but not in transmission and distribution.

In a large deregulated metropolitan area the chosen distribution network operator 155 and transmission operator 140 supply electricity to meet the demands of its energy consumers 100. Consumers 100 in turn contract with one or more generation operators 130 for the actual power that is carried by the same set of wires. The type of generators may vary so as to meet peak demands and grid requirements. Prior to deregulation many of these functions were centrally organized by municipal or state electricity utilities or by investor owned utilities. The local utility would vertically manage consumer electricity delivery from generation to transmission to distribution to retail sale. In hopes of making the system more competitive, as previously described, some aspects (generation and retail sale) of the grid were deregulated but transmission and distribution remained under regulatory control. And unlike the telecommunication industry, the benefits of deregulation have not fully reached the energy consumer. Today the vast majority of energy consumers have but one choice for energy service. That choice and price of service remains largely regulated. Each consumer within a region serviced by the same distribution network operator (often the local utility) is provided with the same service at the same cost. Compared to the telecommunication industry in which today consumers are provided with a plurality of service plans with a wide range of costs and attributes, the deregulation of the electric industry is in a nascent stage.

For todays power grid to realize the promise of active grid management, distributed energy resources and end user services, the components of the grid described above must be interlinked and responsive to each other in a new way. Electricity consumers are not purchasing electricity for its own sake—they are purchasing electricity as one potential energy source (among many) to achieve other goals. Energy services refer to the solutions that service providers can supply to energy consumers that help them meet those goals. There also remains a need to provide energy consumers with a choice of energy service providers and energy services, where electricity delivery is only one of the possible services. The nature of these competitive energy services will vary depending on the needs of different consumers segments, the technologies available, policies and regulations, and the business model of service providers, all which are likely to change and evolve over time. At the same time, these consumer-facing energy services will depend on the transmission and distribution network to deliver electricity as and when needed. This results in the need for consumer-facing energy services and transmission and distribution operations to interact in dynamic ways. In addition, just as the consumer-facing energy services may require the transmission and distribution system to deliver electricity to power the services, transmission and distribution operations could also look to services from the consumer side for grid operations related resources. Therefore, there is a need for bidirectional dynamic interaction between energy services and grid operations. Which services gets delivered to whom and when will be dynamically determined during operations based on bilateral contracts, market mechanisms, or other means to clear such transactions. These and other deficiencies of the prior art are addressed by one or more embodiments of the present invention.

SUMMARY OF THE INVENTION

A grid-responsive energy services system and methodology are hereafter described by way of example. The existing energy distribution grid operates under strict physical and technical guidelines. The voltage, amperage, phase and other physical characteristics of the energy currently being distributed to consumers is unitarily controlled and managed by a distribution network operator. The introduction of various energy inputs, controls and dissimilar energy services risks destabilizing or detrimentally affecting the grid's ability to provide reliable and continuous service and thus has impeded the deregulation and free market potential of energy services. Embodiments of the present invention enable grid-responsive energy services that allow for the dynamic interaction between grid operations and energy services in a synergistic manner. Grid-responsive services refer to services that are provided to the consumer yet are responsive to the physical, technical, operational, and contractual constraints of the energy grid. Grid-responsive services offered under the auspice of the present invention mitigate the concerns and risk of destabilizing or jeopardizing the reliability, efficiency and functionality of the energy transmission/distribution grid, enable new and innovative services that meet the needs of energy consumers, and allow grid operators to acquire grid management services from new sources (such as energy consumers) thereby opening up hitherto unavailable value-added transactions amongst the electric power system value chain participants. The various embodiments of the present invention enable the development of differentiated grid-responsive energy services offered by a plurality of energy service providers. These grid-responsive energy services are energy services that continuously share and react to system information from service providers, consumers and the grid itself to benefit grid operators, energy service providers, and energy consumers.

This interaction is made possible by the introduction of an energy services bridge interposed between the energy consumer and energy distribution network operator. Having this interface allows service providers to offer services that are tailored to the needs of their customers. At the same time the services bridge, or hub, enables impacts to the grid (such as spikes in demand or supply) to be reduced or avoided by adjusting services to respond to grid conditions and by offering grid operations related services to the distribution network operator. One or more embodiments of the present invention enable dynamic information exchange and associated actions by the energy services bridge, or hub, thereby facilitating new energy services, business models, and consumer and grid operations strategies.

The embodiments of the present invention accommodate current and projected energy generation; and storage options open a new market of energy related products and services. In doing so energy asset utilization is optimized and operating efficiency increased. Furthermore, the operational resiliency of the energy grid against any type of physical or cyber attack can be improved as well as the grid's ability to adapt and self-heal from any power disturbance events.

According to one embodiment of the present invention, a grid-responsive energy system includes an energy services bridge interposed between at least one energy services provider and the distribution network operator of an energy transmission/distribution grid. The energy services bridge enables and manages grid compatible energy services on a real-time basis responsive to the conditions of the energy grid.

Information concerning the conditions of the grid is dynamically provided to the energy services bridge and service providers. In this way, energy services can be managed to be compliant and responsive to the real-time conditions of the grid. In other embodiments, the energy services bridge provides aggregate management of a plurality of services offered by a plurality of energy service providers to ensure the service plans are compliant with the technical and physical constraints of the grid.

Another embodiment of the present invention involves a method of management of grid compatible energy services. The method includes the distribution network and operator publishing constraints by which the energy transmission/distribution grid must operate and timely information regarding grid operations conditions. Using the information provided in these constraints and operating conditions, energy services providers develop one or more grid responsive energy services. Energy services providers thereafter engage energy consumers for their energy needs and then provide energy services to the consumer without violating the constraints published by the distribution network operator. For one or many energy services providers to remain compliant with the physical and technical constraints of the energy transmission/distribution grid, an energy services bridge, interposed between the consumer and the distribution network operator (DNO), normalize the grid responsive energy services with the energy transmission/distribution grid constraints and operating parameters.

The energy services bridge further manages aggregate demand on the energy grid by the plurality of energy services providers so as to ensure that the demand on the grid remains within the grid capabilities. At the same time, the energy services bridge provides real-time information to the energy service providers about the grid so that either the bridge or the service providers themselves can actively manage energy services provided to their consumers.

According to yet another embodiment of the present invention, a computer-readable storage medium tangibly embodies a program of instructions executable by a machine wherein the program includes code for enabling grid compatible energy services. That program includes instructions configured to publish transmission/distribution grid operations and/or energy constraints for an energy transmission/distribution grid. It also includes code to provide one or more grid compatible energy services to an energy customer on behalf of one or more energy service providers. The program also includes code to adjust the operation of the one or more grid compatible energy services such that the resulting system operation does not exceed or violate the published energy transmission/distribution grid operations or energy constraints.

Using the same distribution gird, one or more service providers can offer a plurality of energy service plans to conform to the needs of the energy consumer. With the assistance of active grid management, an energy services bridge manages the interaction between the service providers and the distribution network operator to the benefit of the energy consumer. The energy services bridge makes a service orientated grid workable while maintaining its stability. And while the present invention and this specification describe the energy services bridge, the energy services providers and the DNO as all being separate entities, it is conceivable that a vertically oriented enterprise may provide distribution services and still compete on the open market as a provider of energy services and/or the manager of such services. An additional feature of the present invention is the robust ability to incorporate distributed energy resources without fear that such adoption will jeopardize the stability and operational efficiency of the existing grid.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
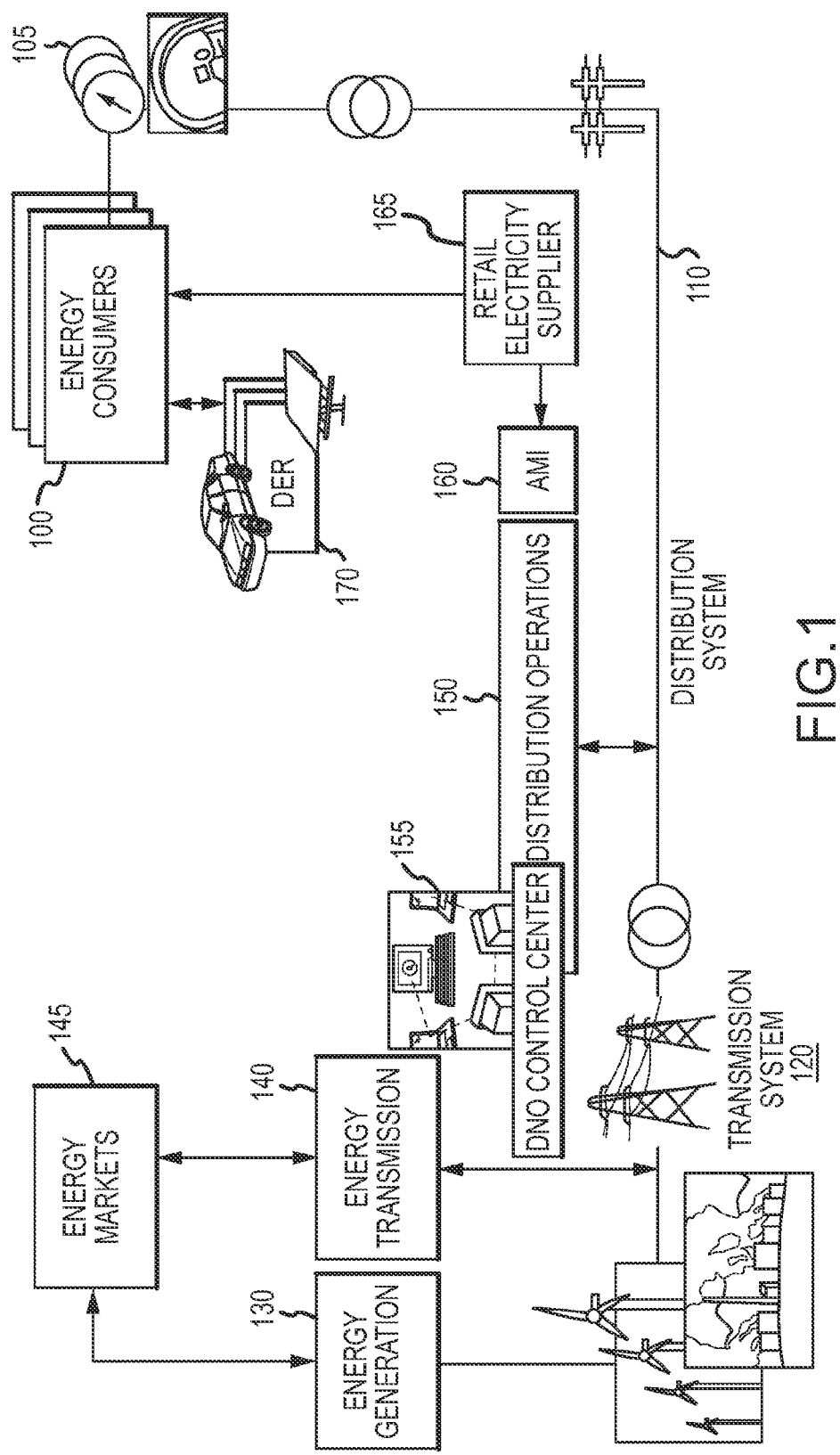
FIG. 1 shows a high level block diagram of the current electrical grid model as would be known to one of reasonable skill in the relevant art.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

An energy services enabling hub or bridge system enables unlimited energy services responsive to the changing conditions of the energy grid. Through the utilization of an enabling energy services bridge, grid compatible energy services can be offered to one or more energy consumers. Moreover, the use of active grid management and integration of Distributed Energy Resources (DER) can enable end-user optimization, market participation, and managed grid operations resulting in improved grid reliability and cost effectiveness.

Embodiments of the present invention are hereafter described in detail with reference to the accompanying Figures. Although the invention is described and illustrated with a certain degree of particularity, it is understood that the present disclosure is made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Terms that are not specifically defined within this specification are to be interpreted according to their common meaning as would be understood and applied by one of reasonable skill in the relevant art. Accordingly, it should be apparent to those skilled in the art that the following description of exemplary embodiments of the present invention are provided for illustration purposes and not for the purpose of limiting the invention as defined by the appended claims and their equivalents.

It is also to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

Figure 2:
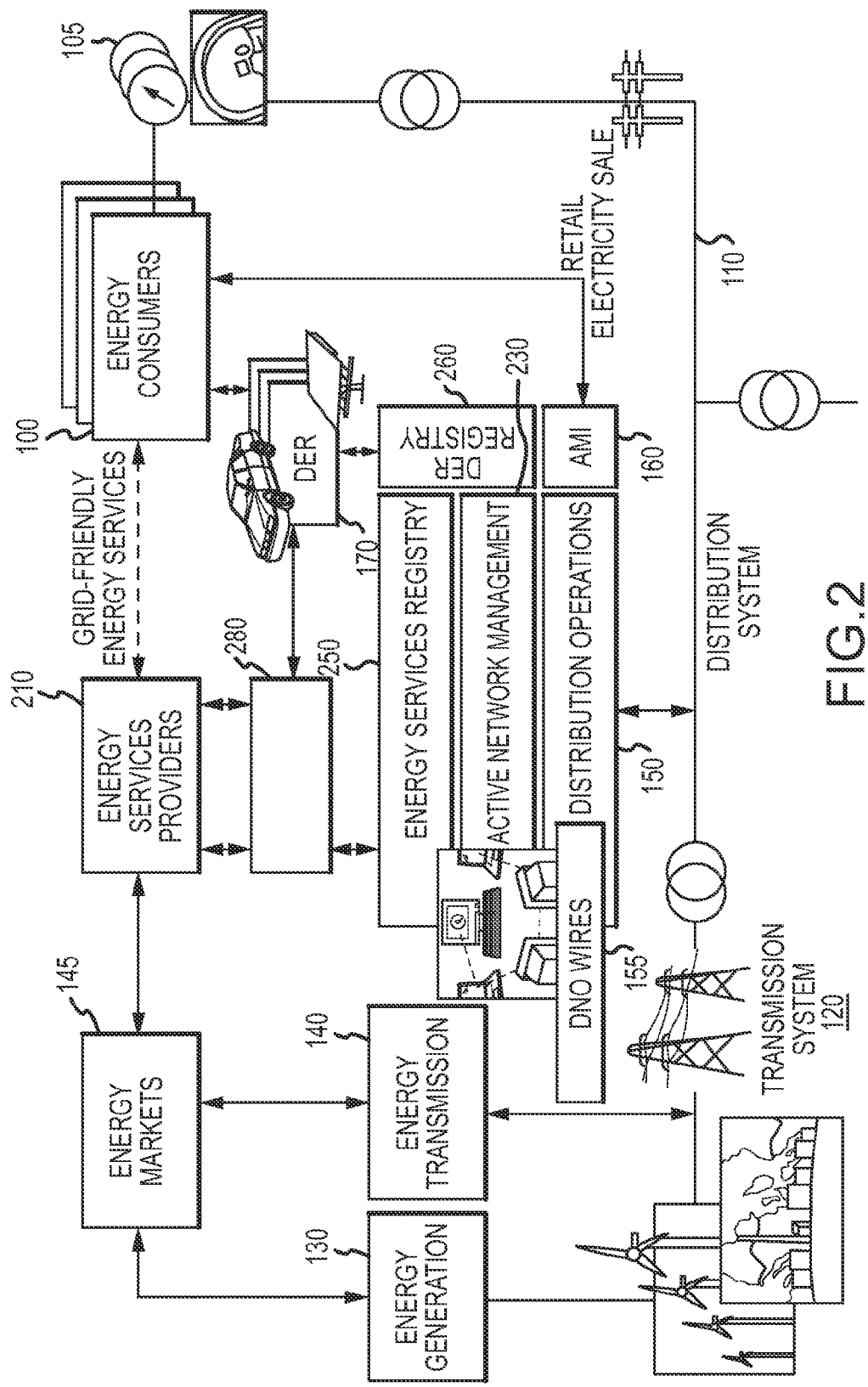
FIG. 2 shows a high level block diagram of a transformed electrical grid model enabling grid-responsive energy services according to one embodiment of the present invention.
Figure 5:
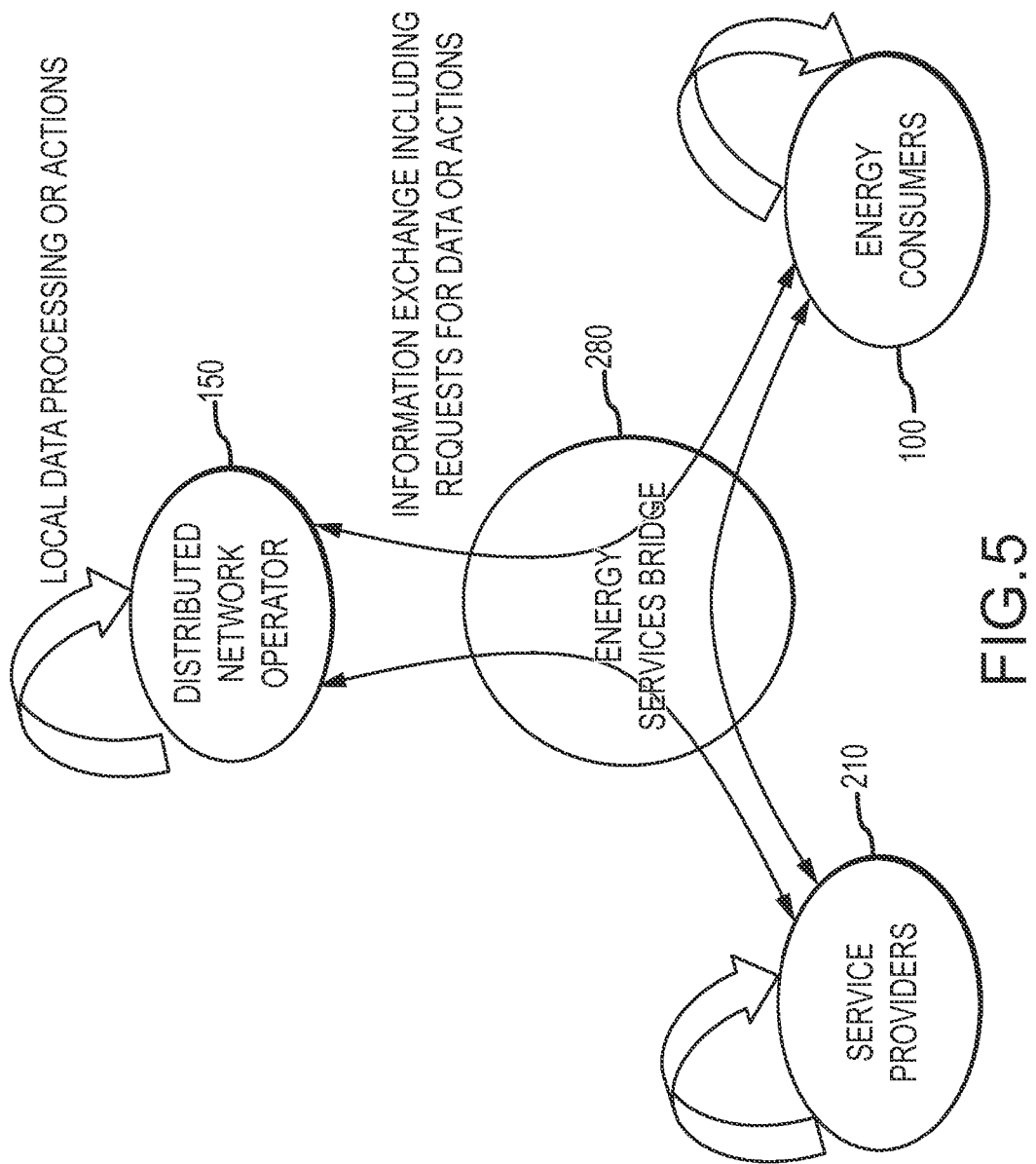
FIG. 5 shows a high level block diagram of a relationship between a energy services bridge, a service subscriber (energy customer), an energy service provider, and a distributed network operator according to one embodiment of the present invention.

FIG. 2 presents a high level block diagram of a system for grid-responsive energy services according to one embodiment of the present invention. Interposed between at least one energy service provider 210 and a distribution network operator 155 exists an energy services bridge 280. The energy services bridge enables a plurality of grid compatible energy services to be offered to energy consumers 100 by the one or more energy service providers 210. In another embodiment of the present invention and as shown in FIG. 5, the energy services bridge 280 is interposed between the at least one energy service provider 280, the distribution network operator 155 and the energy consumers 100 (also referred to herein as a service subscriber).

The current state of the art with respect to energy generation and distribution is characterized by a linear relationship from energy generation to transmission to distribution to consumer use. A consumer signs up with the local utility or government regulated electric company for electrical service. Once hooked up and power is available, a consumer simply pays for the electricity used based on the metered (regulated) rate. While the local utility or electric company may have a few choices where to procure its electricity, the consumer has but one choice. The present invention allows for that model but also enables a decoupled model where the essential functions from generation to transmission to distribution to retail services to end use can be served by one or many entities. According to one or more embodiments of the present invention, rather than having a single provider of electric services to the end consumer, there can be a plurality of energy service providers, each offering different classes of service.

Currently, a retail energy service provider supplies energy to consumers and bills them for their actual consumption. Value-added energy service providers interact with an energy consumer primarily based on their use of energy. Given an energy consumer's connection with the existing grid, the regulated cost of energy and its availability, a current energy service provider assists users in altering their use of energy and facilities operations under the service provider's control to manage consumption and minimize risks with respect to energy shortfalls and optimize the provider's cost/benefit position. The energy service provider operates on "the customer side of the meter" so to speak. For example, a company having a significant energy footprint on the grid can benefit substantially from internally managing its energy use. In some cases larger entities even possess alternative energy production capability within their own environments to augment the energy services provided by the established energy grid. These energy service providers, however, do not interact directly with the DNO. The services they provide, under the systems of the prior art, are simply based on benefits offered to the energy consumer without taking into consideration any impacts to distribution network operations. Similarly, DNOs operate their distribution network using equipment they own with the sole purpose of maintaining grid operations within operating parameters primarily set by regulators. With the large scale adoption of dynamic distributed resources including generation, storage, and load management resources (such as renewable generation, electrical and thermal storage, demand response, and smart electric vehicle charging and discharging), the decoupled approach to grid management and end-use energy management is no longer technically feasible without substantial infrastructure upgrades that make such solutions cost prohibitive. In addition, a solution based solely on grid upgrades does not enable the delivery of new and innovative energy services to consumers substantially limiting economic and social benefits to all stakeholders within the energy industry. The present invention presents a solution to this problem by dynamically linking energy services with grid operations thereby enabling new energy services, enabling unlimited adoption of distributed energy resources, and the reliable operation of the grid using cost effective resources in a highly scalable manner.

According to one embodiment of the present invention, energy service providers 210 interact directly with the DNO 155 and the energy markets 145 to offer a plurality of energy services to energy consumers 100. Operating on top of an energy services bridge 280, each energy service provider 210 can develop and offer a plurality of grid compatible energy services to multiple energy consumers 100. To do so each service is compliant with energy transmission/distribution grid constraints yet is formed to address the specific needs of various consumers.

According to the existing energy distribution system, each energy consumer is offered and obtains the same service. Energy is charged at a kilowatt/hour rate and is metered by the DNO. In the vast majority of markets there is little to no price variance in energy. And while some DNOs offer a price discount for energy used during non-peak periods, such an offering is typically uniform across the entire consumer base. The present invention strives to decouple the retail sales aspect of the energy equation from the distribution and management of the energy grid. And while the current DNO may continue to operate as provider of energy services, it can, according to the present invention, enable other service providers to offer differentiated and competitive energy services to consumers. These service providers could compete with each other to provide consumers who have equal access to the grid, value added energy services leveraging many distributed energy resources including alternative energy generation means and sophisticated energy management.

One aspect of the present invention is, therefore, the ability for multiple energy service providers to offer a plurality of energy services to energy consumers. For example, one or more service providers can specialize in residential energy service plans. Each residential plan can offer energy services that meet the needs of individual consumers in a residential setting. A consumer who is willing to forgo or limit access to on-demand electricity at certain periods for a discount in electrical costs can be offered one service plan while another customer, who is willing to pay a premium for uninterrupted electrical services during specific periods of time, can pay a different fee. For example, a person who works from his home is likely to want, and pay for, unlimited power during the day while a family in which the home sits empty from 8:00 AM to 6:00 PM Monday through Friday may be willing to limit its use of electricity during those hours. Likewise business enterprises can be provided with electrical services that conform with their business requirements. A manufacturing company that has little to no operations between the hours of noon and midnight but does the majority of its work between midnight and 6:00 AM may be able to gain a lower service rate than another manufacturing company that operates from 6:00 AM to 6:00 PM.

Energy service simultaneously reflective of the needs of end consumers and grid operations has been, until now, unavailable primarily due to the limited capabilities of the current electrical grid. Despite the varying needs of energy consumers and their willingness to pay for increased access or willingness to forgo access to energy for a discount, the means to actively manage such services in concert with the operations needs of the electrical grid have not been available. Similarly, the means for DNOs to expose operating constraints, parameters, and information in such a way that energy service providers and consumers can adapt to changing conditions by changing how they use energy has not been available. Achieving these dual outcomes is a major characteristic of the present invention.

The energy services bridge 280, according to one embodiment of the present invention, acts to maintain technical grid compliance by each of the plurality of energy service providers. To do so the energy services bridge 280 normalizes grid compatible energy services offered by each of the plurality of energy service providers with the technical constraints of the energy transmission/distribution grid. The DNO and the transmission network operators must actively maintain the stability of the energy grid. While a number of service providers may want to offer exceptional and reasonable service plans, the grid capabilities remain relatively finite. The energy services bridge 280 enables DNOs and transmission network operators to actively maintain the stability of the energy grid using additional resources made available through grid compatible energy services.

According to one embodiment of the present invention, the energy services bridge normalizes aggregate grid compatible energy services of a plurality of energy service providers with the real time conditions of the energy transmission/distribution grid. This normalization is done so as to provide a variety of services to the energy consumer and yet maintain the stability of the grid. In this version of the present invention each of a plurality of energy service providers contracts with the DNO for a portion of available energy service and assumes the responsibility for a defined portion of physical and technical grid compliance. If, for example, there are three energy service providers and one of the providers one is willing to ensure that their customers will reduce load in the event that the overall load on a specified set of feeders exceed some level, the DNO may provide preferential access to that service provider to the energy services bridge or hub to the detriment of the other two service providers. Presumably the costs and benefits of such services will be passed along to the consumers of the first service provider thereby bringing new value added services and customer benefits to market while simultaneously meeting the grid operations needs of the DNO. Market mechanisms or bilateral contracts are expected to determine how value is exchanged between the grid operator and service provider for grid operations related services delivered and benefits received. However, the benefits from this interaction are expected to be shared in some manner, either directly or indirectly, by the DNO, service provider and consumer. The service provider that gains access to the hub will be able to offer more attractive services and/or pricing to consumers while the ones that are unable to do so will only be able to offer more basic services and pricing models.

The energy services bridge enables the DNO 155, and thus the energy transmission operators 140 and the energy generators 130, to provide energy on a free market basis while still maintaining compliance with physical transmission/distribution grid constraints. One challenge is that each of a plurality of energy service providers may offer multiple different classes of energy services to energy consumers. But ultimately the energy service provider must be compliant with the existing energy grid. A provider cannot offer a service to an energy consumer that would risk the grid's stability. For example, assume a residential consumer wants to pay less for energy because they have installed a photovoltaic array on their roof. Since the consumer will likely have lower power needs and may even be able to provide energy to the grid, they can be offered a discounted service rate; however the service provider must assure the DNO that the consumer's integration in the grid will not technically or physically upset the grid's stability since power could flow in either direction depending on the production and consumption levels in the consumers home. While a single consumer may not significantly impact a distribution feeder, when there are many consumers on that feeder, the issue of who causes the problems and who contributes to the solution becomes critical. The energy services hub model provides a clear solution to the problem by ensuring that the service provider responsible for that residential customer and the DNO can have a very definitive agreement regarding the nature of power flow across that customer's location and the grid based on the type of service that was authorized through the energy services hub. The service provider also gains visibility regarding real time grid condition through the energy services hub that in turn, allows them to adjust production or consumption to stay within parameters agreed to with the DNO. In addition, should the service provider have extra capacity available through their services to consumers, the DNO can also purchase that capacity for managing grid conditions that may be outside of those operating parameters agreed to between the DNO and that service provider. An example is when a DNO may want to acquire load reduction services from service providers during a hot day to reduce overall system load although individual services may be operating within their normal parameters.

Accordingly, one aspect of the energy services bridge is the normalization of each energy service offered by each energy service provider so as to be compliant with the physical and technical constraints of the energy transmission/distribution grid. As the real time conditions of the energy grid vary, the energy services bridge continually ensures that the combined services offered by the various service providers do not exceed the capability of the grid. Or said in another way, the bridge monitors and modifies each service provider's energy consumption based on the real time condition of the transmission/distribution grid and the status of individual services. The energy services bridge can carry out this function since grid-responsive services are designed to be compatible with this function and deliver the information and capabilities necessary for this location-specific dynamic modulation of energy consumption by the energy services hub.

To better understand the role of the energy services bridge, recall the prior example of three service providers. Assume for the purpose of this discussion that provider A has contracted with the DNO at a premium to deliver 1000 kilowatt/hour to its customers. Provider B has contracted for 2000 kilowatt/hour but at a lower rate and with subordinate energy delivery rights to that of provider A. Finally provider C has contracted for 2000 kilowatt/hour at a rate equal to provider B for the first 1000 kilowatt/hour and then lower than the rate offered to provider B for the remaining 1000 kilowatt/hour. As one might expect, provider C's access to the DNO's grid for the last 1000 kilowatt/hour is subordinate to both provider A and B.

According to one embodiment of the present invention, it is the role for the energy services bridge to actively manage the energy demands from the various service providers so as to be compliant with the existing grid conditions. If, in the above example, the grid is capable of delivering only 5000 kilowatt/hour and the demands of each of the service providers remain within their contracted range, each service provider can gain full access to the grid without fear of risking grid stability. If, however, customers associated with provider A are seeking 1500 kilowatts/hour the energy services bridge will actively determine whether the grid can support the extra 500 kilowatt/hour demand and if there are provisions by which to supply provider A with the additional service. The energy services bridge, therefore, can restrict grid access to one or more providers based on the aggregate demand and the aggregate supply or reallocate portions of energy services based on information received from the service providers. This example applies not just to the actual energy transferred but also to the energy transfer capacity of the grid as determined by the physical and operational properties of the grid.

Likewise, if each of the demands of the providers A, B and C are within their contractual limits but the grid, for some reason, is incapable of supplying or transferring enough power to the requisite locations, the energy services bridge can notify the respective providers that a certain amount of energy service will not be available. For example, assume that only 3000 kilowatt hours are available for the next two hours. According to the agreements and assuming that each provider is demanding its contractual amount, provider A would get its 1000 kilowatt hours and the remaining 2000 kilowatt hours would be divided up between provider B and C based on a % ratio. Thus of the remaining 2000 kilowatt hours, provider B would receive 1333 kilowatt hours and provider C would receive 667 kilowatt hours. From that allocation and the service contracts with each provider, energy consumers would receive varied service. For example, a house using provider C may find it has its power curtailed through service provider installed demand response mechanism while the house across the street, using provider A, is brightly illuminated. The same end result could also be achieved by using stored energy or power generation at the end use that effectively curtails the energy consumed from the grid. The specific way in which the desired response is achieved is determined between the service provider and their customers. Regardless of the specific mechanism used to curtail demand, the energy services bridge is able to reduce demand and keep the grid within its desired operating range.

One of reasonable skill in the relevant art will recognize that numerous contractual arrangements can be formed to allocate energy services among a plurality of energy service providers while the aggregate of services offered remains compliant with the technical and physical constraints of the transmission/distribution grid. The energy services bridge provides each energy service provider with the ability to offer to its customers a broad range of services for a market price. In this example, the customers of provider A saw no disruption in service and presumably would pay a premium for such reliability. Service providers B and C saw a varied disruption of service that must be actively managed by each service provider. In this embodiment the energy services bridge would inform service provider B and C of their respective allocation of energy service. Based on their relationships with their customers and according to one embodiment of the present invention, provider B and C would inform the bridge (and thus the DNO) which energy consumers would be denied or provided limited energy service according to their respective contractual agreements. The DNO can verify that contractual obligations are being met against a registry of service providers, authorized grid-responsive services, consumers subscribing the specific services, and authorized distributed energy resources.

One aspect of the energy services bridge, according to one embodiment of the present invention, is the registration of services. The energy services offered by each energy service provider are registered through the bridge with the DNO. In doing so the service offered by the service provider is verified as being compliant with the technical and physical capabilities of delivering those services and is compliant with the information and capabilities that need to be exchanged with the energy services bridge for its operation. Moreover it associates each energy customer with a specific energy service provider and energy service plan. With each energy consumer associated with a registered energy service the DNO, upon direction from the energy service provider and/or services bridge, can actively manage energy services to or from each customer either individually or in the aggregate.

The registration and association of each energy services customer with a particular energy service provider results in the registration of the identity, type, capacity, availability, capabilities, and constraints of associated distributed energy resources (such as flexible demand, generation, and storage). These resources are now available for active network management. In one embodiment of the present invention an active network management system 230 is coupled with the energy service registry 250 so that each customer's contribution to the energy service provider's pool of distributed energy resources is monitored, metered and managed. While in FIG. 2 the registry 250 and active network management module 230 are associated with the DNO, in other embodiments the role of active grid management can fall on the energy services bridge 280 or on the individual energy service providers 210. These functions can be carried out by different parties depending on the state of decoupling, deregulation, and the business models prevailing under different regulatory regimes. The regulatory environment does not impact the present invention. A particular regulatory environment may constrain who would be allowed to carry out certain functions, but does not affect the need for the function itself.

In one version of the present invention, the energy services bridge 280 dynamically adjusts grid compatible energy services responsive to information from the energy service providers including data gained from their one or more energy service customers and information regarding the grid from the DNO. While each energy service customer may have a contractual relationship with an energy service provider, the various constraints and monetary considerations of the contract may be secondary to real time demands for energy. For example, the contract may provide a customer with a lower price point and lower energy access priority over much of the working week but offer the option that the customer can, upon notice, have high priority access to energy during a limited period of time during the week. Upon a service provider gaining such notice from a customer, the demand would be passed to the energy services bridge which can aggregate this demand and other requests from the other service providers. With an aggregate demand for energy formed by normalizing each service provider's requests, the energy services bridge actively manages the request in view of the information about the current and future state of the energy transmission/distribution grid. In this example, assuming that the requests from the service providers to the bridge are compliant with the contractual arrangements and with the capabilities of the transmission/distribution grid, the energy services bridge can inform the DNO that a spike in energy demand is likely to occur from a particular customer. As a result the DNO can access additional resources to actively manage the demand for services and the availability of energy resources as well as inform the bridge that in a specific region it can likely not accept additional demands due to this spike.

The energy services bridge, therefore, manages unplanned and scheduled events by the energy service customers. These events can be based on operational and/or contractual access constraints to the energy transmission/distribution grid or a result of real time conditions of the grid. The energy services bridge also aggregates one or more service classes offered by each of a plurality of service providers so as to present to the DNO a real time aggregate demand on the energy grid. The energy services bridge further actively manages the aggregate of services based on real time conditions of the energy transmission/distribution grid.

Integration of Distributed Energy Resources (DER), such as photovoltaics, wind farms, and the like, into the transmission/distribution grid has been a long established goal. Today various pockets of DER are being used by energy consumers and various DNOs but their presence is limited. One reason for the limitation is the ability (or inability) to actively manage the energy variances produced by DERs into the grid. Co-pending U.S. patent application Ser. No. 12/846,520 entitled "Dynamic Distributed Power Grid Control System" offers one or more solutions by which to actively manage a dynamic transmission/distribution power grid including a grid that encompasses DER.

According to one embodiment of the present invention, each DER 170 would be registered with the DNO 155 along with its associated service plan. A DER registry 260 associates the integration of the DER with a specific energy consumer 100 and energy service provider 210. As a DER interacts with the grid, the DNO 155 and/or energy services bridge 280 can monitor and manage either the introduction of additional energy or an additional energy demand.

For example, consider a large industrial facility that possesses its own internal energy generation facility. That facility could be a natural gas engine generator, a series of windmills combined with a photovoltaic farm, or flexible demand accessed through their building management system. During normal business hours the facility uses its own internally generated power augmented by power provided by the transmission/distribution grid. During non-production periods, such as during the weekends, the facility likely has excess power which, until now, would be either lost (for example, turning off a wind or solar power plant) or placed back onto the transmission/distribution grid. Assuming that the physical constraints of interacting with the grid are met, the DNO would normally provide to the business a certain credit for providing additional energy. However the free sale of the power to another energy consumer was never an option.

According to one embodiment of the present invention, a DER such as the facility described above, can interact directly with various service providers to market its capability. While the energy would still flow over the established grid, the financial aspects of the transaction can be managed and marketed by the service providers and energy services bridge irrespective of actual grid operations. Without regard to grid operations and the actual flow of energy different parties can, according to one embodiment of the present invention, broker energy sales. The power would be transported over the same grid and the DNO would simply get a fee for the use of the grid and for enabling the service providers in supplying power. Thus as a facility generates excess power on the weekend, a service provider may be able to commercialize this excess power by identifying and selling to other customers within the regional area additional energy. For example, a local amusement park may see energy demand spike on the weekend while weekdays are very predictable. The service provider can therefore arrange for the excess power of the business facility to be attributed directly to the increased demand of the amusement park. While the energy services bridge of the present invention enables the commercial transaction, its active network management capability ensures that the power flows involved in the transaction remain within acceptable operating parameters set by the DNO. These capabilities are distinguishing features of the current invention.

For such a transaction to take place the energy services bridge must be able to actively manage not only this transaction but also how this transaction integrates with the other demands on the grid by other service providers. As both customers and the DER are registered with the DNO, the DNO can monitor and meter both the introduction of excess energy to the grid by the DER and increased demand of energy by the energy consumer. The DNO will thereafter monetize the use of the transmission/distribution grid. In this example the energy distribution grid truly becomes a grid rather than a hierarchal distribution model that exists today. The present invention enables the DNO to automatically schedule power flows across their grid and account for those flows from source to destination all the while ensuring that grid operating constraints are not violated. While transmission scheduling for moving bulk power has been in existing for many decades, this capability has not been available on distribution networks. The energy services bridge enables services transactions including the sourcing and delivery of local energy through systematic interactions between service providers, consumers and DNOs, and through the use of active grid management. The present invention does not presuppose any particular regulatory scheme, just that external constraints such as who is allowed to own the system and who is allowed to deliver services will be determined within the particular regulatory regimes in place in different jurisdictions.

Another example of a robust integration of DER into the transmission/distribution grid is the growing presence of all-electric or hybrid-electric vehicles. When an owner of an electric vehicle charges the auto at his or her residence, the associated use of energy is metered and charged to the energy consumer's account. The metered amount of energy use is associated with a particular service provider who in turn bills the consumer for the use of the energy. However when the consumer gains additional energy for the vehicle at a location outside his or her home it has been a challenge how to associate the energy consumed with the correct consumer.

Using the energy services bridge of the present invention in conjunction with the registry of both the consumer and of the DER, an accurate metering of energy consumption and production can be obtained anywhere. As each DER (an electric vehicle for example) is registered with the DNO and is associated with a particular customer and service provider, an accurate accounting of energy consumption or its ability to give energy back can be obtained regardless of where the DER interacts with the transmission/distribution grid. For example, should an individual need to charge his car at a friend's house, the friend would not have to worry about being charged for the energy consumed. The DNO would recognized that the DER integration into the grid is associated with a particular customer and service provider and can isolate the power consumed by the vehicle apart from that consumed by the home owner. The metered transaction will be associated with the appropriate service provider charged to the owner of the electric vehicle. The location and operating condition of the grid is also be taken into account to provide information back to the service provider to appropriately modulate the service or take active control at a location (such as cutting of charging) to maintain stable operation of the grid. Certainly other types of DERs such as photovoltaic cells, wind generation, geothermal generation and the like, are contemplated by the current invention. Any type of DER (generation, storage, load management, or others) can be integrated into the electric power system for simultaneously provisioning energy services, participating in various energy, capacity and ancillary services markets, and maintaining stable operations of the grid.

The ability to customize individual service classes of energy consumption and registration of not only the customer but also various resources can be dynamically used to manage grid constraints. For example, consider three electric vehicles, owned by three different consumers visiting a fourth individual's home. All of the vehicles need to be recharged and all are connected to the transmission/distribution grid. As none of the vehicles is registered with the homeowner none of the energy consumed by the vehicles will be charged to the homeowner's account. Nonetheless, the increased demand by the homeowner on the transmission/distribution grid must be actively managed. The energy services bridge accomplishes this type of management. While the type of connection to the electric grid may be sufficient to charge one electric vehicle, the capacity of the connection will not be sufficient to charge four vehicles. The energy services bridge will however, manage this situation intelligently taking into account grid constraints and the types of services associated with each vehicle.

If all of the vehicles plugged in to an outlet at the friend's house with no grid-responsive energy service plan, then the capacity of electrical connection would be instantly exceeded resulting in a breaker trip and a blackout at the home. If they plugged in at different homes on the same distribution feeder, they could exceed the capacity of the feeder and blackout that neighborhood. If each of the three vehicle owners possessed the same service plan with the same service provider but without the energy services bridge or the active distribution management capability, each would be provided with an equal opportunity to have their respective car recharged resulting in a blackout. However one or more embodiments of the present invention enable each consumer to have differing access to energy and allow the energy services bridge with active distribution management capability to intervene and deliver vehicle charging in a fair manner without risking an outage. One vehicle owner may, for example, demand and pay for unlimited and premium access to power, regardless of location, so that his car can always be charged. The second owner may have a plan that charges a premium when using a power source outside of her home and, when accessing power outside of her home, receives power at a lower charging level. Finally, the third individual may have limited access to power beyond certain hours. For example he may be able to only charge the vehicle between midnight and 6:00 AM. The service providers and the DNO use this information to actively manage the power grid. Using these agreements and the ability to identify each vehicle (DER) and associate it with a particular consumer and service plan, the access to power for each can be actively managed. Without modifying the vehicles themselves, the first customer will, in this example gain full access to the energy resources of the grid and charge his car at his friend's house. The second may find that the vehicle is charging but at a much slower rate as the demand for power is being actively managed in view of other aggregate demands on the energy transmission/distribution grid. Lastly the third individual may find his or her vehicle is receiving no charge. Indeed the third individual may be denied power even if the grid has energy resources available based on his or her current service plan. Using this type of registration and individualized service plans, the energy services bridge can actively manage the aggregate demands on the energy transmission/distribution grid. Under all circumstances the Active Network Management capability will be monitoring the real time conditions on the local grid and ensuring that under no conditions are more vehicles given permission to charge simultaneously than the grid can handle. Moreover, the present invention enables energy consumers to detach from and attach to the transmission/distribution grid at will. Energy service becomes much more akin to a free market system in which the rules of supply and demand drive the cost and attributes of services. In the same manner that the deregulation of the telecommunication industry has spawned the use of mobile phones and service plans offered by numerous competitors, aspects of the present invention enable energy services to become marketable products inspiring cost competition and innovation ultimately benefiting the energy consumer.

Another aspect of the present invention, and consistent with the energy services bridge capability to actively manage the transmission/distribution grid, is the bridge's ability to offer ancillary services to energy markets, transmission operators, and distribution network operators. These services can include distributed energy resource generated energy (as illustrated in the example above), capacity management, voltage management, Volt Ampere Reactive (VAR) management, aggregate management of a plurality of service classes, energy grid constraint management, asset management, energy management, market participation, grid reliability, outage management, grid maintenance, upgrades, network operations optimization, operating cost reduction and the like. These ancillary services are dynamically created from available DER and actively managed in such a way that these ancillary services can be reliably produced, traded, and consumed. The energy services bridge and the Active Network Management capability jointly enable the dynamic aggregation of resources and the creation of specific services (such as voltage control, VAR control, active power import or export, constraint management and the like) to deliver ancillary services to specific locations within the grid.

According to another embodiment of the present invention, the energy services bridge provides normalized information regarding the real time condition of the energy transmission/distribution grid so that each energy services provider can dynamically manage its energy services. By gaining such normalized information each energy service provider can manage the services it provides based on the varying conditions of the grid. In such an instance the service provider becomes actively involved in determining which of its energy consumers gain, are denied or are limited access to available energy services. The determination of energy access is thereafter conveyed to the DNO via the energy services bridge that thereafter acts on those directions. In this manner the energy services provider remains actively involved in determining which, if any, of its customers are to be denied services or will participate in delivering services for grid operations or other ancillary services in a location-specific (location on the grid) manner. Based on the real time conditions of the grid, the energy services bridge dictates to each energy services provider constraints under which it must operate. Using its knowledge of the varying classes of services offered to its customers, the services provider can then give direction to the energy services, energy services bridge, and the DNO for implementation. One role of the energy services bridge, in this embodiment, is to manage both the individual and aggregate inputs of a plurality of energy service providers and ensure that the aggregate demand meets the current grid constraints. For example, despite the issued constraints placed upon each of a plurality of service providers, a single service provider may respond with energy demands that exceed its allocation. However upon considering the other demands issued by the other service providers, the aggregate demand may be within the current energy grid constraints. The energy services bridge can therefore accept the excess demand (assuming that there exists a contractual means by which to monetize the excess demand) without jeopardizing the stability of the energy transmission/distribution grid. The energy services bridge can also, an another embodiment, serve as a real time intermediary to acquire services from other providers to keep the said service provider from violating its commitments.

Having the energy service providers and the energy services bridge actively manage their service plans according to the varying actual conditions of the grid enables the DNO to focus on maintaining the stability of grid operations while providing a means for energy services to be marketed. While the capability of the grid has not changed and is continually maintained, the access to energy and various energy management services can be treated as a marketable commodity much like the cellular towers supporting the various telecommunication service providers are maintained and operated by different companies. Since each energy service provider has a contractual arrangement with the DNO regarding its service plans, the energy service providers themselves can market excess capacity and energy services to other service providers.

For example, consider the simplified illustration where there are two energy service providers and each has contracted with the DNO for access to 50% of the available energy service. One skilled in the relevant art will recognize that the current invention can support, and indeed contemplates, multiple service providers each associated with a complex energy service relationship with the DNO. Nonetheless the current example is useful to illustrate one of the capabilities of the present invention. In this example the energy services bridge recognizes that either a scheduled or real time decrease in available energy is forthcoming due to energy shortage, network congestion, constraint limit or the like. The limitation of energy services available on the grid is conveyed to each service provider and each service provider, based on its agreements with its customers (energy consumers), determines how to allocate its portion of the available energy service. In doing so one of the energy service providers may determine that it does not need or require its entire allocation of power. At the same time the other energy service provider may determine that, while it can deny service to some of its customers and remain within its allocated portion of the grid available service, it does have the ability to utilize and monetize more energy. At this point the two energy service providers can communicate directly or via other market available means to negotiate terms on which the excess power associated with the first service provider can be used by the second. Once an agreement has been reached (or if one is already in place) the energy services bridge can reallocate the portions of energy while still, from the DNO's perspective, maintaining the same aggregate demand for energy and transport capacity within the physical and technical constraints of the energy transmission/distribution grid. Indeed the entire transaction may be transparent to the DNO. Once the DNO enables the service providers with a common set of rules to deliver grid-responsive energy services, the dynamic interplay between active distribution management (for grid operations), service providers' systems, and consumers' energy management systems (using DER) balance the fluctuations in demand, generation, and transport of energy (taking into account network topology, real time conditions, and grid constraints) while maintain the grid within its acceptable operating limits. This is a distinguishing feature of the present invention.

Another embodiment of the present invention includes a method for managing grid compatible energy services on an energy transmission/distribution grid. Such management begins with publication by the DNO and, as required, by the transmission network operators, of physical and technical grid constraints. These constraints include the limitations and parameters by which the physical energy grid can operate and the requirements by which any grid compatible energy service must conform if it is to interact with the grid. Thereafter grid compatible energy services (i.e., those that actively contribute towards maintaining the published requirements) can be developed and offered by one or more energy service providers. Energy consumers engage or contract with at least one of these energy service providers that in turn provide energy service access and innovative energy management services to the energy consumer.

Finally management of grid compatible energy services includes normalizing the plurality of grid compatible energy services by an energy services bridge so as to be within the constraints of the energy transmission/distribution grid.

Figure 3:
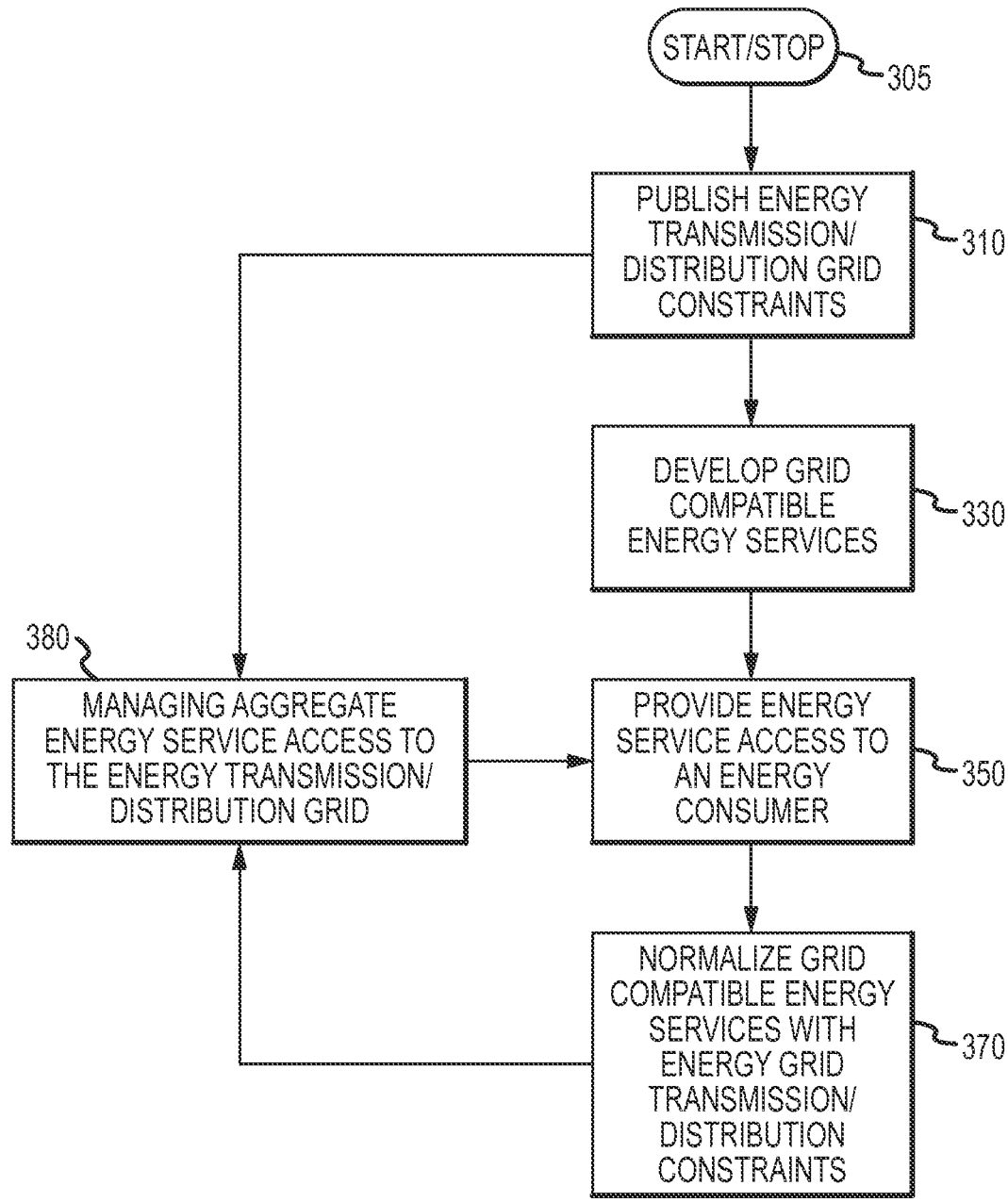
FIG. 3 is a flowchart of one embodiment of a method for management of grid compatible energy services according to the present invention.

A flowchart depicting examples of the methodology for managing grid compatible energy services on an energy transmission/distribution grid is shown in FIG. 3. In the description that follows it will be understood that each block of the flowchart illustrations, and combinations of blocks in the flowchart illustrations, can, in some instances, be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Individual blocks of the flowchart illustration support combinations of means for performing the specified functions and combinations of steps for performing the specified functions. It will also be understood that each block of the flowchart illustration, and combinations of blocks in the flowchart illustration, can be implemented by special purpose hardware-based computer systems that perform the specified functions or steps, or combinations of special purpose hardware and computer instructions.

FIG. 3 presents a flowchart of a method for management of grid compatible energy services according to one embodiment of the present invention. The process starts 305 with the publication 310 of physical and technical constraints by which the transmission/distribution grid operates, one or more energy service providers can develop 330 grid compatible energy services. A wide variety of energy services can be offered by each of the service providers as required by consumers. For example, services associated with industrial needs can be developed by one service provider wherein another can develop residential or personal services. Or the same service provider can offer different classes of service. Under the current market, large industrial consumers and residential users largely access, use, and pay standard rates for essentially the same energy delivery service. There is little to no variation in price or access to the grid. The present invention, with a multitude of energy service options, allows the free market to dictate the relative price and accessibility of energy and energy related value-added services. Service providers will no longer be constrained to just delivering energy (kilowatt hours) to customers, but they can create complex energy management solutions that meet the needs of specific customer segments, all the while remaining grid-compatible through the energy services bridge of the present invention. The ability to deliver value-added energy services to consumers while simultaneously delivering grid operations services to grid operators and energy and ancillary services to energy markets using geographically dispersed DER as well as grid assets transforms the grid operations, energy delivery, and end-use energy management paradigm that exists today.

With each energy consumer associated with an energy service plan, access 350 to various energy resources can occur via the exiting transmission/distribution grid as dictated by individual plans. As each consumer operates under his or her own service plan, and the plan likely differs from one consumer to the next, the aggregate of grid compatible energy services is normalized 370 so as to be maintained within the constraints of the transmission/distribution grid.

For the energy grid to remain stable and operate within its physical and technical constraints, the aggregate access to the grid must be actively managed 380. According to one embodiment of the present invention this aggregate management 380 of energy services is accomplished by an energy services bridge interposed between the energy service providers and the DNO. Using published constraints of the energy transmission/distribution grid, along with scheduled and real time variations in the capability of the grid or variations in energy generation, the energy services bridge manages allocation of system operations related services among the plurality of energy service providers.

To do so the energy services bridge normalizes the conditions of the grid to each associated service provider and energy consumer. In some instances the energy services bridge actively controls access to the energy consumers associated with each energy service provider so that the aggregate demand for energy service remains within the physical constraints of the grid. In other instances the energy services bridge simply passes along information regarding the status of the grid to the energy service providers.

To actively manage access to the energy transmission/distribution grid with any sort of detail, the distribution network operator and the distribution system need not only actively manage the generation, transmission and distribution assets but also actively meter and control consumption. In the current model of energy distribution, consumers have little control and influence on active energy management. The energy systems of the prior art offer very basic consumer orientated services. By offering varied pricing options at a consumer level as made possible by the present invention active energy management becomes a reality. Energy services including active control management of distributed energy resources results in a plethora of new sophisticated energy tools that can reshape energy markets, generation, transmission, distribution, sale and use.

Under embodiments of the present invention, the access to the electrical grid remains the same, but two houses on the same street accessing the same grid may pay a different rate for electricity. The rate may vary based on who the energy consumer engages as a service provider since that provider may have different classes of energy services and different contractual arrangements with the DNO. And as the energy service is different, access to the grid, and the energy it carries, is monitored and controlled. Assume for example that both homes have continual access for essential services, but one home is willing to limit electricity usage during peak hours to receive a discount in costs while the other consumer would rather have unlimited access. The service plans offered by the service provider must first be determined compatible with the grid. Said differently, the grid must be able, in the aggregate, to service the plans offered by the various service providers. Second there must be a means by which to control access to energy service.

As in this example, the service plans offered by the service provider rely on the fact that some of its consumers will forgo or limit energy service at certain periods. By doing so the service provider can offer plans so that its aggregate of service classes falls within the physical and technical limitations of the grid or at least its allocation of the grid services. Each consumer's service plan is registered with the DNO so that the DNO, energy services bridge, or service provider can actively manage energy access. In this example, if peak demand rises such that the DNO conveys to the energy services bridge that allocation of services will be limited, the bridge and service providers can convey to the DNO which consumers will receive limited access to the grid. According to one embodiment of the present invention, specific consumers will be identified via a registry as to their class and terms of service. A message will be communicated to a metering function located at the consumer's residence (or the like) that certain aspects of the class of service are being invoked. Thereafter one or more devices at the consumer's location will limit access to the energy grid in accordance with the agreed upon class of service.

In this example the residence that agreed to limit energy services during peak times may find that the amount of energy available is limited. The electric dryer or electric heater may not operate. While at the same time the house across the street has unlimited access. This sort of differential of electrical services contemplates smart grid appliances and a robust communicative capability beyond the scope but contemplated by this description. This sort of differentiation also contemplates the need for an intermediary (energy services provider) to normalize operations between end use energy services and grid operations. The energy services bridge in conjunction with active network management supplies the functional capabilities required for this normalization.

Another feature of the present invention is the ability of the energy services bridge to dynamically adjust or modify energy services based on information from the energy service providers and/or the DNO. Beyond the contractual right and technical ability to limit a consumer's access to energy, the real time conditions of the grid may be such that a limitation is not necessary. The energy services bridge receives real-time conditions of the energy services grid from the DNO. At the same time it gains varied demands for energy from each of the energy service providers. Using this combined set of information the energy services bridge manages allocation of energy services among the energy service providers, and thus the energy consumers, so as to maintain the stability of the grid while meeting the contractual obligations of the energy service providers.

Another aspect of the energy services bridge's ability to manage grid compatible energy services is its seamless integration of various forms of distributed energy resources. The present invention enables energy consumers and energy service providers to integrate alternative energy resources (DER) with the existing energy transmission/distribution grid. Such integration requires active management of the DER as well as the confidence that the DER is compliant with the physical and technical constraints of the grid. The present invention, in one embodiment, places this responsibility on the shoulders of the providers of energy services. The energy service provider interacts directly with the DER to manage their operations. Based on the availability of DER and the services they can offer, a particular energy service provider can offer different classes and prices of services. In essence more options are available to each consumer.

Figure 4:
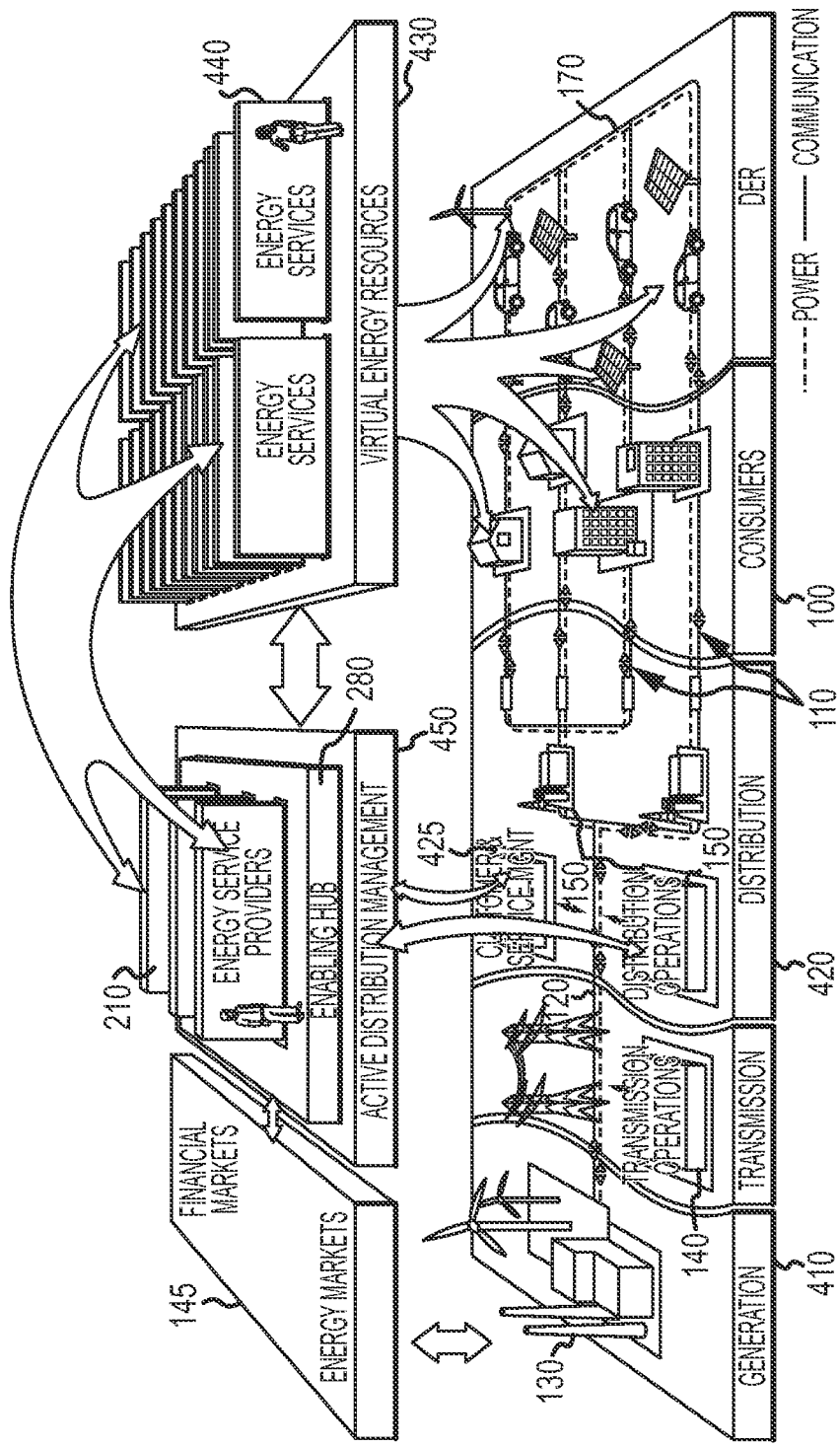
FIG. 4 shows a high level block diagram of a grid-responsive energy services network according to one embodiment of the present invention.

FIG. 4 is a high-level block diagram showing the functional relationship between various components of grid-responsive energy services, according to the present invention. FIG. 4 graphically depicts how the existing transmission grid 120 interfaces with the existing distribution grid 110 for energy services. Energy is generated 140 by one or more energy generation companies 130 and transmitted via high voltage power lines 120 to various regional distribution centers 420. Distribution operations 150, managed by the DNO, convey the power to the consumers 100 via distribution lines 110.

As shown the grid-responsive energy services of the present invention not only convey energy from the generators 130 to the consumers 100 but also open a bi-directional avenue of communication between the various parties.

Built upon a platform of virtual energy resources 430 exists a plurality of energy services. Each of these services is not only uniquely associated with a consumer but is also tied to one of a plurality of energy service providers 210. These energy service providers interface with distribution operations 150 and an enabling hub 280 (also referred to herein as an energy services bridge). Underlying this interaction is a system of active distribution grid management 450. This circular representation highlights the interdependencies of each aspect of a fully operational system of grid-responsive services.

Lastly FIG. 5 shows a high level block diagram of the relationship between an energy services bridge, a service subscriber (energy customer), an energy service provider, and a distributed network operator according to one embodiment of the present invention. The energy service bridge 280 lies in the center of the distributed network operator 150, the energy service providers 210 and the energy customers or consumers 100. Acting as an information interface, the energy service bridge collects, normalizes and conveys pertinent information to the various bodies to make the offering of multiple grid compatible energy services to the energy customer 100 a reality. Based on the information that is passed between the various components each entity can make independent decisions on how to carry out their respective functionality. The DNO may alter one or more of its processes or actions based on information from the service customers or the service providers. Similarly the energy customers 100 may choose a different energy service provider 210 or grid compatible energy service based on information from the providers 210 and/or the DNO.

The flow of information depicted in FIG. 5 not only represents historical data but requests for a wide variety of ancillary services apart from the simple delivery of energy. For example a customer 100 may find services offered by a particular energy service provider 210 only tangentially related (or not at all) to the delivery of energy attractive and based on that offering elect to make a change. This may be in part or indirectly due to the information exchanged between the energy service providers and the DNO. For example a service provider may be able to offer new services based on information gained from the DNO otherwise unknown to the energy customer.

As has been previously discussed a number of ancillary services can be offered to energy consumers by energy service providers. One aspect of those services is the integration of distributed energy resources, aka DER. A customer with access to a DER may desire to aggregate and/or virtualize the DER capability and present it to a distributed network operator or service provider. Recruited as a possible addition to the energy transmission/distribution grid through grid compatible energy services, the energy services bridge aggregates and/or virtualizes the DER to provide the a DNO, a service provider and or the energy markets a composite capability ancillary service. Based on grid constraints injected by various entities responsible for the same operation of the grid, the aggregate or composite ancillary service can be presented back to customers as an ancillary service, or in response to a request for an ancillary service. For example perhaps a certain number of energy customers desire (and are willing to pay for) only energy generated by distributed energy resources. Once available this type of ancillary service can be allocated to the grid compatible energy services offered by the service providers, decomposed by the energy services bridge, and dispatched to meet grid services demanding such type of energy. Of course all of this is modified by external conditions and modifications to the constraints of the grid. Said differently, the identification and offering of ancillary services, including a DER related ancillary service, is dynamic and iterative.

It is also useful to consider and understand the relationship between one or more DERs and the energy transmission/distribution grid. Distributed energy resources are typically associated with a energy consumer. However DERs can also interact directly with service providers. Moreover the DER clearly interacts with the grid itself making them of special interest to the DNO. In a general case a DER is associated with one or more energy customers. The energy customer may have a photovoltaic source of energy, a wind farm or both. Or a customer may have rights to a portion of a DER. Regardless the customer associates its DER with grid compatible energy service offered by a service provider. While in most cases the DER would be associated with a single service provider it is contemplated that large DER offerings may be allocated to multiple grid compatible energy services and service providers. The service provider provides information about the distributed energy resources (among other things) to the DNO via the energy services bridge.

The energy services bride processes the transaction and enables the grid compatible energy services and ancillary services through the use of active distribution network management. Pertinent information about the ancillary services and DER are conveyed to the DNO and finally the grid for execution.

As will be appreciated by one of reasonable skill in the relevant art, some portions of this specification and the present invention are presented in terms of symbolic representations of operations that may be physically represented as data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or "module" is a self-consistent sequence of operations or similar processing leading to a desired result. In this context, algorithms, modules, engines and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "normalizing", "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for grid-responsive energy services through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of the present invention as defined by the claims.

In preferred embodiments, the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

A number of program modules may be stored on the hard disk, magnetic disk, ROM or RAM, including an operating system, one or more application programs or software portions, other program modules and program data. A user may enter commands and information into the personal computer or the like through input devices such as a keyboard and pointing device.

A computer embodying the present invention may operate in a networked environment using logical connections to one or more remote computers, such as a remote computer. The remote computer may be another personal computer, a server, a router, a network PC, a peer device or other common network node, and typically includes many or all of the elements described above relative to the personal computer. The logical connections described herein include local area networks (LAN) and wide area networks (WAN). Such networking environments are commonplace in offices, enterprise-wide computer networks, Intranets and the Internet.

When used in a LAN networking environment, the personal computer is connected to the local network through a network interface or adapter. When used in a WAN networking environment, the personal computer typically includes a means for establishing communications over the wide area network, such as the Internet. This means is connected to the system bus via the serial port interface. In a networked environment, program modules depicted relative to the personal computer, or portions thereof, may be stored in the remote memory storage device. It will be appreciated that the network connections shown are exemplary and other means of establishing a communications link between the computers may be used.

The particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

I claim:

1. A computer implemented system for management of grid compatible energy services in conjunction with an energy transmission/distribution grid, comprising:
   a microprocessor operable to execute a program of instructions; and
   a non-transitory computer-readable storage medium coupled to the microprocessor and tangibly embodying a set instructions for management of grid compatible energy services, wherein said set of instructions when executed by the microprocessor include steps for
   publishing by a distribution network operator energy transmission/distribution grid constraints of the energy transmission/distribution grid;
   developing grid compatible energy services by a plurality of energy services providers;
   providing energy services access by the distribution network operator to one or more energy customers on behalf of the plurality of energy services providers; and
   normalizing by an energy services bridge aggregate grid compatible energy services with the energy transmission/distribution grid constraints of the energy transmission/distribution grid.

2. The system of claim 1, further comprising instructions for identifying energy transmission/distribution grid constraint violations by each energy services provider.

3. The system of claim 2, further comprising instructions for managing energy transmission/distribution grid constraint compliance information.

4. The system of claim 3, further comprising instructions for managing by each energy services provider aggregate energy service access to the transmission/distribution grid.

5. The system of claim 1, wherein energy transmission/distribution grid constraints include technical constraints regarding interfacing distributed energy resources with the energy transmission/distribution grid.

6. The system of claim 1, wherein grid compatible energy services includes engaging at least one energy consumer by at least one of the plurality of energy services providers with grid compatible energy services.

7. The system of claim 1, further comprising instructions for managing a plurality of energy services classes on a real time basis responsive to normalized real time conditions of an energy transmission/distribution grid.

8. The system of claim 1, further comprising managing by the energy services bridge energy service access for each energy service provider responsive to contractual considerations.

9. The system of claim 1, further comprising instructions for managing by the energy services bridge energy service access for each energy service provider responsive to operational and/or physical considerations of the energy transmission/distribution grid.

10. The system of claim 1, further comprising instructions for managing by the energy services bridge energy service access for each energy service provider responsive to real time conditions of the energy transmission/distribution grid.

11. The system of claim 1, further comprising instructions for dynamically adjusting grid compatible energy services responsive to information from the energy services providers, the one or more energy customers and/or the distribution network operator.

12. The system of claim 1, wherein responsive to changes in operational and/or physical conditions of the energy transmission/distribution grid, altering grid compatible energy services.

13. The system of claim 1, wherein responsive to information from the energy service provider, altering distribution network operator operations.

14. The system of claim 1, wherein responsive to information from the energy consumer, altering distribution network operator operations.

15. The system of claim 1, wherein responsive to information from distributed energy resources, altering distribution network operator operations.

16. The system of claim 1, further comprising instructions for registering grid compatible energy services offered by the energy services providers with the energy services bridge.

17. The system of claim 16, further comprising instructions for registering grid compatible energy services offered by the energy services providers with the distribution network operator.

18. The system of claim 16, wherein registration of grid compatible energy services includes identification of one or more associated energy customers to the energy services bridge.

19. The system of claim 16, wherein registration of grid compatible energy services includes identification of one or more associated energy customers to the distribution network operator.

20. The system of claim 16, wherein registration of grid compatible energy services includes communication of an association of a particular grid compatible energy service with one or more energy customers.

21. The system of claim 16, wherein registration of grid compatible energy services includes communication of an association of a particular customer and grid compatible energy service with one or more distributed energy resources.

22. The system of claim 1, wherein normalizing includes normalizing aggregate grid compatible energy services of a plurality of energy services providers with real time conditions of the energy transmission/distribution grid.

23. The system of claim 1, further comprising instructions for conveying by the energy services bridge to the distribution network operator information about ancillary energy services from the energy services providers.

24. The system of claim 1, further comprising instructions for conveying by the energy services bridge to the distribution network operator operable ancillary energy services from the energy services providers.

25. The system of claim 1, further comprising instructions for conveying by the distribution network operator to the energy services bridge a request for ancillary energy services from the energy services providers.

26. The system of claim 25, further comprising instructions for delivery of the ancillary energy services requested by the distribution network operator from the energy services providers.

27. The system of claim 1, further comprising instructions for transfer of financial and contractual information for completing transactions for ancillary services delivered by the energy services bridge to the distribution network operator from the energy services providers.

28. The system of claim 27, wherein ancillary energy services comprise distributed energy resource generated energy management, capacity management, frequency management, energy reserve management, capacity reserves management, voltage management, Volt Ampere Reactive "VAR" management, energy grid operating parameter management and energy grid constraint management.

29. The system of claim 1, further comprising instructions for conveying, by the energy services bridge to the distribution network operator, information about ancillary energy services regarding aggregated services and distributed energy resources from the energy services providers.

30. A non-transitory computer-readable storage medium tangibly embodying a program of instructions executable by a machine wherein said program of instructions comprises a plurality of program codes for enabling grid compatible energy services, said program of instructions comprising:

program code configured to publish energy transmission/distribution grid constraints for an energy transmission/distribution grid;

program code configured to collect information regarding compliance with the energy transmission/distribution grid constraints;

program code configured to provide grid compatible energy services to an energy customer on behalf of a plurality of energy service providers; and program code configured to normalize aggregate grid compatible energy services with the energy transmission/distribution grid constraints of the energy transmission/distribution grid.

31. The computer-readable storage medium of claim 30, further comprising program code configured to identify energy transmission/distribution grid constraint violations by each energy services provider.

32. The computer-readable storage medium of claim 31, further comprising program code configured to manage energy transmission/distribution grid constraint compliance information.

33. The computer-readable storage medium of claim 30, wherein energy transmission/distribution grid constraints include technical and/or contractual constraints regarding interfacing distributed energy resources with the energy transmission/distribution grid.

34. The computer-readable storage medium of claim 30, further comprising program code configured to provide information to enable management of a plurality of grid compatible energy services responsive to normalized conditions of an energy transmission/distribution grid.

35. The computer-readable storage medium of claim 30, further comprising program code configured to manage energy service access for each energy service provider responsive to contractual considerations.

36. The computer-readable storage medium of claim 30, further comprising program code configured to manage energy service access for each energy service provider responsive to operational and/or physical considerations of the energy transmission/distribution grid.

37. The computer-readable storage medium of claim 30, further comprising program code configured to manage energy service access for each energy service provider responsive to conditions of the energy transmission/distribution grid.

38. The computer-readable storage medium of claim 30, further comprising program code configured to enable dynamic adjustment of grid compatible energy services responsive to information from the energy services providers, the plurality of energy customers and/or a distribution network operator.

39. The computer-readable storage medium of claim 30, wherein responsive to changes in operational and/or physical conditions of the energy transmission/distribution grid, further comprising program code configured to alter at least one of the grid compatible energy services.

40. The computer-readable storage medium of claim 39 further comprising program code configured to alter distribution network operations responsive to information from at least one of the plurality of energy service providers.

41. The computer-readable storage medium of claim 39 further comprising program code configured to alter distribution network operations responsive to information from at least one of the plurality of energy consumers.

42. The computer-readable storage medium of claim 39 further comprising program code configured to alter distribution network operations responsive to information from distributed energy resources.

43. The computer-readable storage medium of claim 30, further comprising program code configured to register grid compatible energy services offered by at least one of the plurality of energy services providers with a distribution network operator.

44. The computer readable storage medium of claim 43 wherein registration of grid compatible energy services includes identification of an association between one or more energy customers and a selected grid compatible energy service to the distribution network operator.

45. The computer-readable storage medium of claim 43, wherein registration of grid compatible energy services includes identification of the plurality of energy customers to the distribution network operator.

46. The computer-readable storage medium of claim 43, wherein registration of grid compatible energy services includes communication of an association of a particular grid compatible energy service with each of the energy customers to the distribution network operator.

47. The computer-readable storage medium of claim 30, further comprising program code configured to convey by an energy services bridge to a distribution network operator, ancillary energy services offered by the energy services providers.

48. The computer-readable storage medium of claim 30, further comprising program code configured to convey by an energy services bridge to the distribution network operator, operable ancillary energy services offered by the plurality of energy services providers.

49. The computer-readable storage medium of claim 30, further comprising program code configured to convey by the distribution network operator to the energy services bridge a request for ancillary energy services from the plurality of energy services providers.

50. The computer-readable storage medium of claim 49, further comprising program code configured to deliver ancillary energy services requested by the distribution network operator from the at least one of the plurality of energy services providers.

51. The computer-readable storage medium of claim 30, wherein ancillary energy services comprise distributed energy resource generated energy management, capacity management, frequency management, energy reserve management, capacity reserves management, voltage management, Volt Ampere Reactive "VAR" management, energy grid operating parameter management and energy grid constraint management.

* * * * *